S. B. SCHENCK.
CONTROL SYSTEM.
APPLICATION FILED MAY 3, 1915.
1,295,930.
Patented Mar. 4, 1919.
2 SHEETS—SHEET 1.
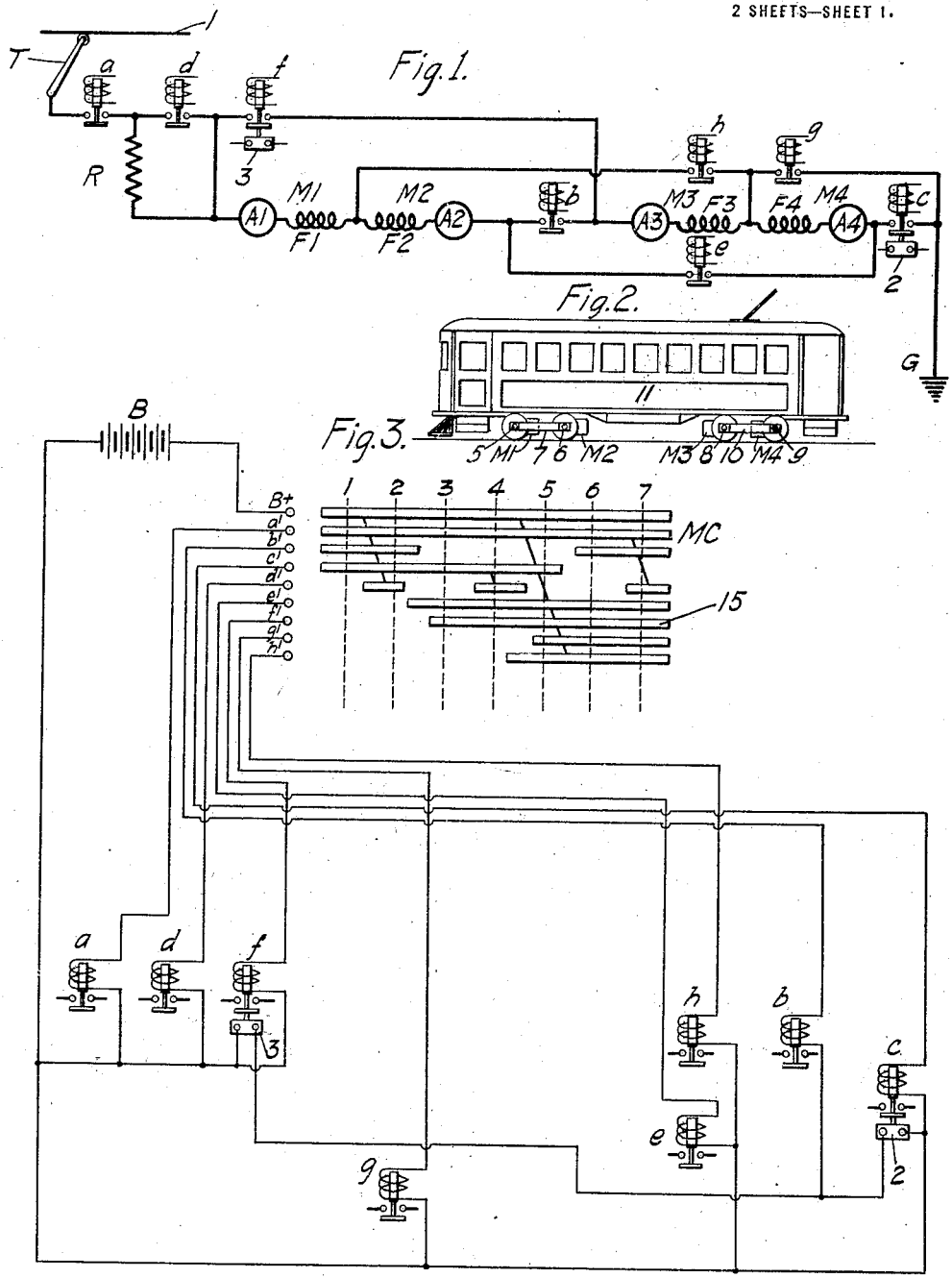
WITNESSES:
INVENTOR
Samuel B. Schenck.
BY
ATTORNEY

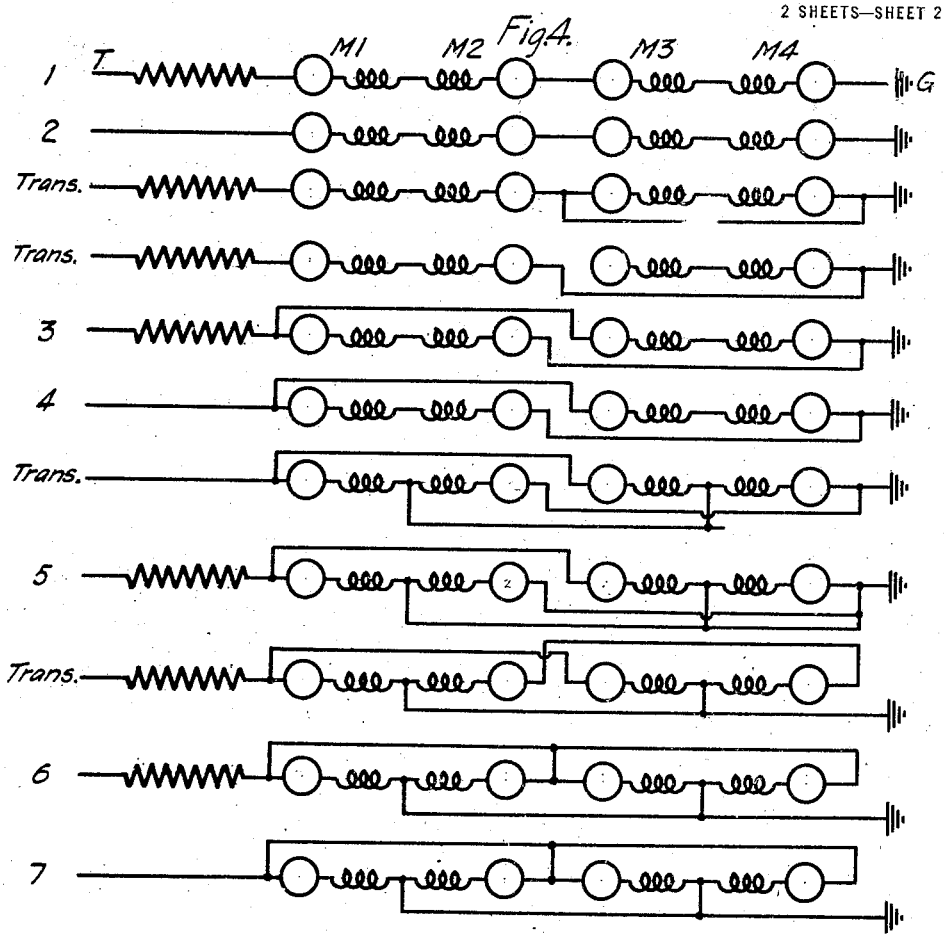

ary equipment and employ means
UNITED STATES PATENT OFFICE.

SAMUEL B. SCHENCK, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,295,930.     Specification of Letters Patent.     Patented Mar. 4, 1919.

Application filed May 3, 1915. Serial No. 25,459.

*To all whom it may concern:*

Be it known that I, SAMUEL B. SCHENCK, a citizen of the United States, and a resident of Wilkinsburg, in the county of Allegheny and State of Pennsylvania, have invented a new and useful Improvement in Control Systems, of which the following is a specification.

My invention relates to methods of, and means for, controlling dynamo-electric machines, and it has special reference to the control of so-called four-motor equipments that are employed commonly upon electric railway cars or locomotives for purposes of propulsion.

One of the objects of my invention is to improve and simplify the mode of operation and means of controlling an equipment of the above-indicated class which shall embody a relatively small number of switching devices for governing the motor-circuit connections and which shall be adapted to provide a plurality of running speeds.

Another object of my invention is to provide a control system of the unit-switch type which shall be so arranged and connected as to permit of the establishment of the desired circuit connections during the accelerating period, with a minimum number of unit switches.

According to my invention, I provide a four-motor equipment and employ means whereby, in changing the motors from series-parallel relation to full-parallel relation, an equalizer connection is first established, one motor of each branched circuit of the series-parallel group is independently short-circuited, then the short-circuited motors are connected in a single local circuit, and finally, all of the motors are connected in parallel circuit relation. Moreover, during the changes of connections just referred to, the motors that are short-circuited temporarily are located upon different trucks of the vehicle.

In the accompanying drawings, Figure 1 is a diagrammatic view of the main circuit connections and main control apparatus of a system of control embodying my invention; Fig. 2 is a view, in side elevation, of an electrically propelled vehicle that is provided with a four-motor equipment such as is under consideration; Fig. 3 is a diagrammatic view of the auxiliary control-circuit connections and auxiliary control apparatus for governing the operation of the main control apparatus shown in Fig. 1; Fig. 4 is a set of simplified diagrammatic views of the main-circuit connections of the control system in different positions of the master controller; and Fig. 5 is a sequence chart, indicating the positions of the various unit switches in the various positions of the master controller.

Referring to the drawings, a supply circuit 1—G is adapted to deliver energy to a plurality of driving motors $M^1$, $M^2$, $M^3$ and $M^4$ through an accelerating resistor R and a plurality of electrically operated unit switches $a$, $b$, $c$, $d$, $e$, $f$, and $g$ which are adapted to arrange the motor-circuit connections in accordance with the operation of a suitable master controller MC.

The several unit switches may be of any well-known construction, and, although, I have illustrated them as of the electrically operated type, they may be, and preferably are, of the well-known electro-pneumatic type, as will be understood. No description of these switches is deemed necessary, inasmuch as they are old and familiar in the art, although attention is called to switches $c$ and $f$ which are provided with auxiliary interlock switches 2 and 3, respectively, that are adapted to be closed to complete certain auxiliary control-circuit connections when the respective unit switches $c$ and $f$ occupy their open or "out" positions. The purpose of the interlock switches 2 and 3 is obviously to preclude the improper operation of certain of the unit switches.

The motors $M^1$, $M^2$, $M^3$ and $M^4$, respectively comprise armatures $A^1$, $A^2$, $A^3$ and $A^4$ and field magnet windings $F^1$, $F^2$, $F^3$ $F^4$ which are connected in series-circuit relation. Moreover, the field-magnet windings $F^1$ and $F^2$ and the field-magnet windings $F^3$ and $F^4$ are adjacently disposed for the purpose of maintaining the field windings on the grounded or negative side of the motors, as much as possible, during the operation of the system. The motors $M^1$ and $M^2$ are associated with the respective driving axles 5 and 6 of a truck 7, while the motors $M^3$ and $M^4$ are respectively associated with the driving axles 8 and 9 of a truck 10, said trucks 7 and 10 being adapted to support and drive a car or locomotive body 11.

The master controller MC embodies a movable conducting segment 15 which is adapted to coöperatively engage a plurality of stationary contact terminals B+, $a'$, $b'$, $c'$, $d'$, $e'$, $f'$, $g'$ and $h'$, upon the position-indicating lines 1, 2, 3, 4, 5, 6 and 7, whereby energy is supplied from a battery B, or other suitable source, to the energizing coils of the several unit switches $a$ to $h$, inclusive, in a predetermined sequence.

Assuming the circuit connections and apparatus to occupy the positions shown in the figures, the operation of the system is as follows: The master controller MC is first moved into its position 1, thereby establishing a circuit from the battery B, which includes contact terminals B+ and conducting segment 15, where the circuit divides, one branch including contact terminal $a'$ and the energizing coil of unit switch $a$ and the battery; another branch including contact terminal $b'$, energizing coil of switch $b$, either interlock switch 2 of unit switch $c$ or interlock switch 3 of unit switch $f$ and the battery; and another branch which includes contact terminal $c'$, the energizing coil of switch $c$ and the battery. The switches $a$, $b$ and $c$, therefore, are energized and closed.

Energy is thereby delivered from supply-circuit conductor 1 through trolley T, unit switch $a$, accelerating resistor R, motor $M^1$, motor $M^2$, switch $b$, motor $M^3$ and motor $M^4$ and switch $c$ to the ground or return conductor G, as shown in step 1 of Fig. 4. The several motors, therefore, are started into operation at slow speed.

In order to increase the motor speed, the master controller MC is moved into position 2, in which conducting segment 15 is brought into engagement with contact terminal $d'$, whereby a circuit is completed which includes terminal $d'$, the energizing coil of the switch $d$ and the battery. Upon the energization of switch $d$, said switch is closed to exclude the accelerating resistor R from the motor circuit. The circuit connections of the motors are shown in step 2 of Fig. 4.

In moving the master controller MC from position 2 to position 3, two transition circuit connections are established, as illustrated in Fig. 4. The first connection results from the deënergization of contact terminal $d'$, and the consequent opening of the corresponding unit switch $d$, and the energization of contact terminal $e'$ by reason of the engagement therewith of the conducting segment 15. The engagement referred to, establishes a circuit which includes contact terminal $e'$, the energizing coil of the unit switch $e$ and the battery. Thus, unit switch $e$ is energized and closed. The opening of switch $d$ serves to reinsert the accelerating resistor R into circuit while the closure of switch $e$ shunts or short-circuits the motors $M^3$ and $M^4$ and connects the motors $M^1$ and $M^2$ in series circuit with the resistor R across the source of energy.

The next transition connection is effected by the disengagement of conducting segment 15 from contact terminal $b'$, whereby the switch $b$ is opened to disconnect the shunted motors $M^3$ and $M^4$ from the active motors $M^1$ and $M^2$ between the armatures $A^2$ and $A^3$.

When the master controller MC reaches position 3, contact terminal $f'$ is energized and, therefore, its corresponding unit switch $f$ is closed. The closure of unit switch $f$ connects the positive side of the series-connected motors $M^3$ and $M^4$ to the trolley T and thereby establishes the several motors in a series-parallel group having the accelerating resistor R in series circuit therewith. It will be noted that both motors of the respective branch circuits of the series-parallel groups are associated with a single driving truck.

In the next step of the controller, position 4, contact terminal $d'$ and its corresponding unit switch $d$ is again energized. Therefore, the unit switch $d$ is closed to exclude the resistor R from circuit. The circuit connections, therefore, are as shown in step 4 of Fig. 4.

Between positions 4 and 5 of the master controller MC, a transition connection is established as soon as the conducting segment 15 engages the contact terminal $h'$, whereby a circuit is completed through the energizing coil of unit switch $h$ to the battery. Switch $h$, therefore, is closed and thereby establishes an equalizing connection between the corresponding mid-points of equal potential of the several sets of series-connected motors which constitute the series-parallel group hereinbefore referred to. Obviously, since the interconnected points are of equal potential, this connection does not affect the operation of the motors. It, however, facilitates the desired connections to be established in the last positions of the master controller, as will be seen.

In position 5, contact terminal $d'$ is deënergized and its corresponding switch $d$ is opened to re-insert the resistor R, while conducting segment 15 is brought into engagement with conducting segment $g'$, whereby a circuit is established through the energizing coil of the switch $g$ to the battery. The switch $g$, therefore, is energized and closed and thereby connects the equalizing connection, just mentioned, to the ground G. In so doing, the motors $M^2$ and $M^4$, which are associated with different driving trucks of the vehicle, are independently short-circuited, while the motors $M^1$ and $M^3$ are thus connected in multiple relation across the full voltage of the source. The motor connections are shown in step 5 of Fig. 4.

In moving the master controller MC to position 6, a transition connection is established by reason of the disengagement of the conducting segment 15 from the contact terminal $c'$, whereby the unit switch $c$ is deënergized and opened, thereby leaving the active motors $M^1$ and $M^3$ in parallel relation, as just set forth, but re-arranging the independently short-circuited motors $M^2$ and $M^4$ and connecting them in series relation in a single local circuit, as shown in Fig. 4.

In position 6, contact terminal $b'$ is again engaged by the conducting segment 15, and the unit switch $b$ is closed, provided the one or the other of the unit switches $c$ and $b$ is opened. The closure of switch $b$ serves to again connect the armatures $A^2$ and $A^3$ and, by so doing, arranges all of the motors $M^1$, $M^2$, $M^3$ and $M^4$ for full-parallel operation, although the resistor R is still in circuit therewith.

In the last position of the controller, position 7, contact terminal $d'$ is again energized, and its corresponding unit switch $d$ is closed to exclude the starting resistor R from circuit, leaving the driving motors connected in full-parallel relation, as indicated in step 7 of Fig. 4.

By reason of the peculiar mode of transition set forth, the desired operating connections of the several motors are effected with a minimum number of switches. The reversal of the direction of flow of current through some of the motors also contributes to the simplicity of the system, while the maintenance of at least one motor of each of the driving trucks in active service during the transition of circuit connections from series-parallel to full parallel, insures more desirable and easier operating and riding conditions.

Obviously, modifications in the mode of operation and arrangement of circuit connections may be effected without departing from the spirit and scope of my invention, and I aim to cover such modifications in the appended claims.

I claim as my invention:

1. The method of controlling a plurality of electric motors, which consists in connecting said motors in a series-parallel group, then individually short-circuiting one motor of each series-connected set, then connecting said short-circuited motors in a single local circuit, and finally connecting all of said motors in full-parallel relation.

2. The method of controlling four electric motors, which consists in connecting the motors in series-circuit relation, then connecting them in series-parallel arrangement, then establishing an equalizing connection between the series-connected motors of the branch circuits constituting the series-parallel arrangement, then establishing independent short-circuit connections for one motor of each branch circuit, then connecting said independently short-circuited motors in a single local circuit, and then establishing full-parallel connections for all of said motors.

3. The method of controlling four electric motors normally connected in series-circuit relation, which consists in connecting said motors in a series-parallel group, in interconnecting the mid-points of equal potential of the several branch circuits thereof, then short-circuiting one motor of each branch circuit, and finally connecting all of the motors in full-parallel relation.

4. The method of controlling four electric motors that are disposed in pairs upon two trucks of an electric vehicle, which consists in connecting the motors in a series-parallel group, the branch circuits thereof respectively including motors of different trucks, then short-circuiting a motor in each of the branch circuits, then connecting the short-circuited motors in a single local circuit, and finally connecting all of the motors in full-parallel relation.

5. The method of controlling four electric motors that are disposed in pairs upon the trucks of an electrically propelled vehicle, which consists in connecting the motors in a series-parallel group, the branch circuits thereof respectively including motors of different trucks, then interconnecting the intermediate equal-potential points of said branch circuits, then independently short-circuiting one motor of each branch circuit, then connecting said short-circuited motors in series in a single local circuit, and finally connecting all of said motors in full-parallel relation.

6. The method of controlling four electric motors and changing their connections from series-parallel arrangement to full-parallel relation, which consists in establishing an equalizing connection between the motors of the two series-connected sets of the series-parallel group, then short-circuiting one of the motors of each of the series-connected sets, leaving two motors in parallel across the source of energy, and finally connecting all of the motors in full-parallel arrangement.

7. The method of controlling four electric motors and changing their connections from series-parallel arrangement to full-parallel relation, which consists in establishing an equalizing connection between the motors of the two series-connected sets of the series-parallel groups, then connecting one of the motors of each set in independent local circuits, then arranging the motors so connected in a single local circuit, and finally connecting all of the motors in full-parallel arrangement.

8. In a system of control, the combination with four electric motors, of control apparatus and circuit connections, for connecting said motors in series-circuit relation, connecting the motors in a series-parallel group, short-circuiting one motor of each of the branch circuits of the series-parallel group, connecting the short-circuited motors in a single local circuit, and then connecting the motors in full-parallel relation.

9. In a system of control, the combination with a supply circuit and a plurality of motors, of means for connecting the motors in series-parallel and in parallel relation across the supply circuit, and means for establishing an equalizing connection between the series-connected motors and for short circuiting one motor in each branch circuit during the transition from series-parallel to parallel relation of the motors.

10. In a system of control, the combination with a supply circuit and a plurality of motors connected in series-parallel relation thereto, of means for effecting a transition of said motors from series-parallel to parallel relation, a portion of said motors being short-circuited and a local circuit being subsequently formed therethrough during said transition.

11. In a system of control, the combination with four motors, of means for connecting the motors in series-parallel and in parallel relation, and means for establishing an equalizing connection between the series-connecting motors in the branch circuits of the series-parallel arrangement and for short circuiting one motor in each branch circuit during the transition from series-parallel to parallel relation.

In testimony whereof, I have hereunto subscribed my name this 28th day of April 1915.

SAMUEL B. SCHENCK.